(No Model.) 2 Sheets—Sheet 2.
L. MÜLLER.
FEED TROUGH.
No. 463,069. Patented Nov. 10, 1891.
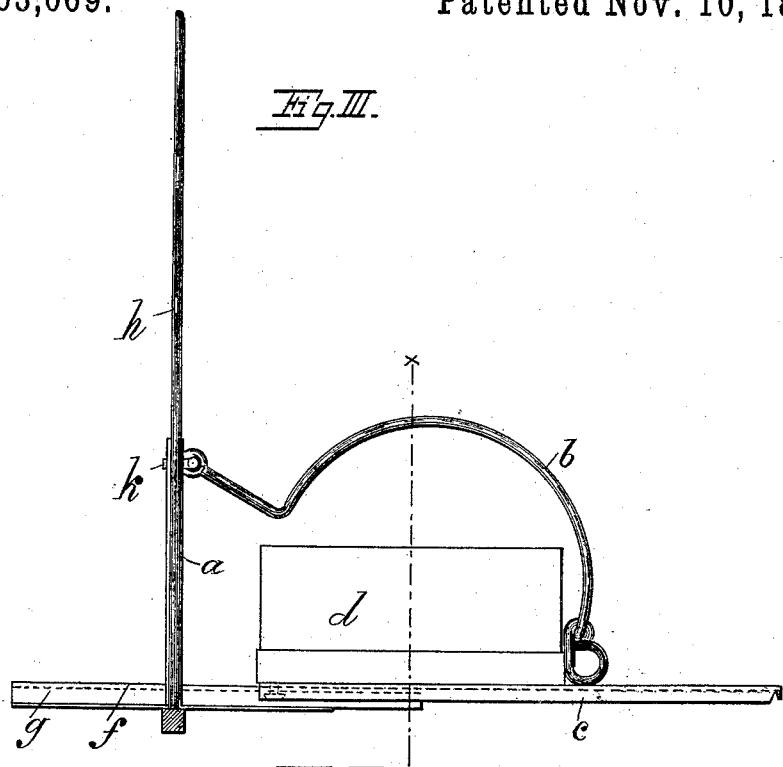
Fig. III.
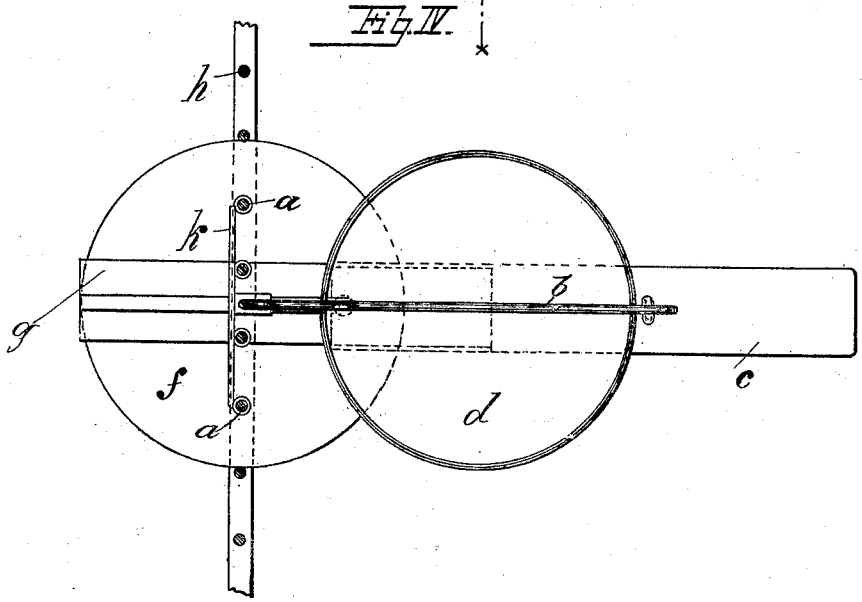
Fig. IV.
Witnesses:
George E. Cruse
Harry S. Rohrer
Inventor:
Louis Müller
By Knight Bros.
Attorneys.

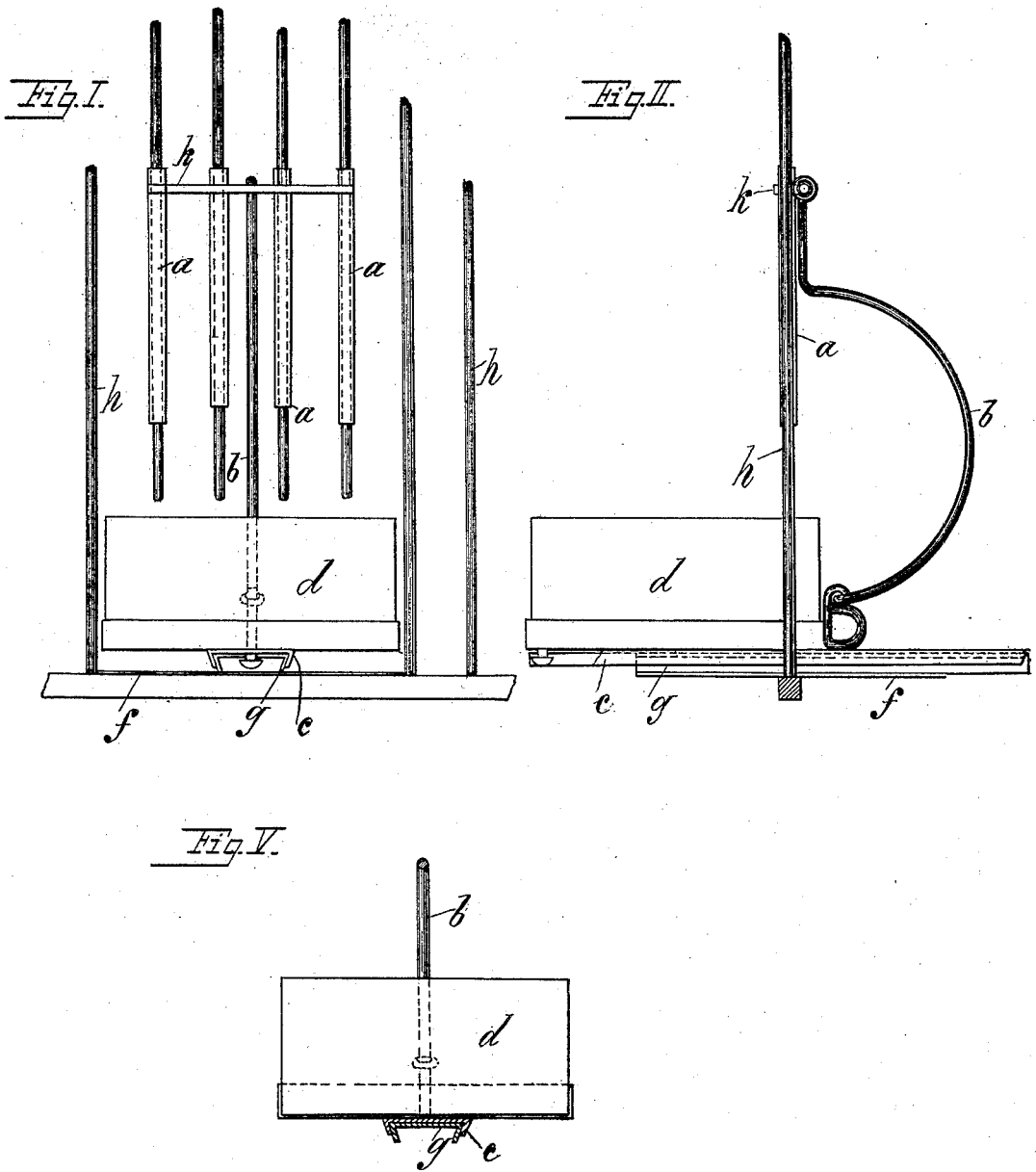

UNITED STATES PATENT OFFICE.

LOUIS MÜLLER, OF WERNIGERODE, GERMANY.

FEED-TROUGH.

SPECIFICATION forming part of Letters Patent No. 463,069, dated November 10, 1891.

Application filed April 28, 1891. Serial No. 390,738. (No model.)

*To all whom it may concern:*

Be it known that I, LOUIS MÜLLER, of Wernigerode, in the Kingdom of Prussia and German Empire, have invented new and useful Improvements in Feeding-Troughs for Animals, of which the following is a specification, reference being had therein to the accompanying drawings.

My invention relates to certain improvements in feeding-troughs for animals having for its object to provide for insuring the security of the animal while supplying the pan with food, and to automatically effect the closing of the opening or entrance through which the pan is removed from the cage or closure; and to these ends the invention consists in means whereby as the feeding-pan is withdrawn or removed from the cage or closure the entrance-opening is adapted to be closed by suitable medium by such withdrawal or removal of said pan, all substantially as hereinafter more fully disclosed, and pointed out in the claims.

In the accompanying drawings, Figure I shows a front view of the improved device with the food-pan pushed into the cage and with the grid hereinafter described in its raised position. Figs. II and III are side views of the apparatus when the pan or receptacle is inside or outside of the cage, respectively. Fig. IV is a plan of the arrangement shown in Fig. III, and Fig. V is a sectional elevation through line $x\,x$ in Fig. III.

Referring to the drawings, $a$ represents a grid or row of hollow metal bars sliding up and down upon the fixed or solid bars $h$; $b$, a rod which is hinged at one end to the sliding base $c$, to which the food-receptacle $d$ is attached, and at the other end to the grid. The separate bars in the grid are joined by a stay or cross piece $k$. To the base $f$, which may be of any desired shape, is attached a guide $g$, along which the sliding base $c$, carrying the food-receptacle, can be slid into the cage. On the pushing of the food-receptacle into the cage the grid is raised by reason of its connection with the slide $c$ through the rod $b$. By pulling out this receptacle again the grid descends and closes the aperture. Thus the entrance or opening of the cage, through which the feeding-pan is removed or withdrawn for supplying it with food, is automatically closed by such removal or withdrawal of pan to insure the security of the animal against escape at that time.

The bars of the sliding grid $a$ are tubular or hollow and are moved up or down upon the bars $h$ of the cage by means of a rod $b$ on the pushing in or drawing out of the food-receptacle. Instead of one food-receptacle two or more may be attached to the sliding base $c$.

What I claim, and desire to secure by Letters Patent of the United States, is—

1. The combination, with the cage or closure and the sliding feeding-pan, of the sliding grid or door, and the hand-actuated rod hinged to said grid or door and the feeding-pan support, respectively, substantially as specified.

2. The combination, with the cage or closure having the guide and the feeding-pan support adapted to slide upon said guide, of the grid comprising hollow bars adapted to slide upon the bars of the cage or closure, and the hand-actuated rod hinged to the cross-piece of said grid and to said feeding-pan support, respectively, substantially as set forth.

In witness whereof I have hereunto set my hand in presence of two witnesses.

LOUIS MÜLLER.

Witnesses:
 PAUL FISCHER,
 WILHELM SCHWIETHAL.